US011250172B2

(12) United States Patent
Patwardhan et al.

(10) Patent No.: US 11,250,172 B2
(45) Date of Patent: Feb. 15, 2022

(54) HANDLING WIRELESS CLIENT DEVICES ASSOCIATED WITH A ROLE INDICATING A STOLEN DEVICE (71) Applicant: Hewlett Packard Enterprise Development LP, Houston, TX (US)

(72) Inventors: Gaurav Patwardhan, Santa Clara, CA (US); Sachin Ganu, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 575 days.

(21) Appl. No.: 15/965,870

(22) Filed: Apr. 28, 2018

(65) Prior Publication Data
US 2019/0332824 A1 Oct. 31, 2019

(51) Int. Cl.
G08B 29/00 (2006.01)
G06F 21/88 (2013.01)
H04L 29/06 (2006.01)
H04W 12/06 (2021.01)
H04W 4/02 (2018.01)
H04W 84/12 (2009.01)

(52) U.S. Cl.
CPC .......... G06F 21/88 (2013.01); H04L 63/0876 (2013.01); H04W 4/02 (2013.01); H04W 12/06 (2013.01); H04W 84/12 (2013.01)

(58) Field of Classification Search
CPC ........ G06F 21/88; G06F 1/3234; G06F 21/44; G06F 21/552; G06F 21/73; H04K 2203/18; H04L 67/18; H04L 9/0866; H04L 9/0872; H04L 63/0876; H04L 63/101; H04L 63/30; H04L 63/0227; H04W 12/02; H04W 12/06; H04W 12/104; H04W 12/63; H04W 12/71; H04W 12/80; H04W 84/12
USPC ......................................................... 726/35
See application file for complete search history.

(56) References Cited

U.S. PATENT DOCUMENTS

| 8,402,134 B1 * | 3/2013 | Hir | H04W 12/1206 709/224 |
|---|---|---|---|
| 8,402,559 B2 | 3/2013 | Baum | |
| 9,369,838 B2 | 6/2016 | Boulay et al. | |
| 9,576,465 B1 | 2/2017 | Schwindt | |
| 9,584,528 B2 | 2/2017 | Bhatia et al. | |
| 9,622,269 B2 | 4/2017 | Siraj et al. | |

(Continued)

OTHER PUBLICATIONS

Kim et al., LAPWin: Location-Aided Probing for Protecting User Privacy in Wi-Fi Networks, IEEE, Oct. 21, 2014, pp. 427-435. (Year: 2014).*

(Continued)

*Primary Examiner* — Roderick Tolentino
*Assistant Examiner* — Jenise E Jackson
(74) *Attorney, Agent, or Firm* — Hewlet Packard Enterprise Patent Department (57) ABSTRACT

Example method includes: receiving, by a network device, a connection request to a wireless local area network (WLAN) from a client device; determining, by the network device, that the client device is associated with a particular role indicating that the client device is stolen; and performing, by the network device, a set of special handling operations that facilitates maintaining an active connection between the client device and the WLAN, collecting and reporting information about the client device to an investigation agency.

17 Claims, 4 Drawing Sheets

(56) References Cited

U.S. PATENT DOCUMENTS

| | | | |
|---|---|---|---|
| 9,860,703 B2* | 1/2018 | Ortiz | H04W 4/029 |
| 2008/0238608 A1 | 10/2008 | Goldstein | |
| 2009/0210935 A1 | 8/2009 | Miley et al. | |
| 2014/0280840 A1* | 9/2014 | Satapathy | H04L 67/303 |
| | | | 709/223 |
| 2015/0168173 A1* | 6/2015 | Lewis-Evans | G08G 1/096811 |
| | | | 701/454 |
| 2016/0100287 A1* | 4/2016 | Thornycroft | H04W 40/244 |
| | | | 455/456.1 |
| 2017/0085566 A1* | 3/2017 | Kim | H04L 63/0876 |

OTHER PUBLICATIONS

Zehl et al, LoWS: A Complete Open Source Solution for Wi-Fi Beacon Stuffing based Location-based Services, IEEE, Jul. 13, 2016, pp. 1-8. (Year: 2016).*

Ma et al, A Hybrid Rogue Access Point Protection Framework for Commodity Wi-Fi Networks, IEEE, Apr. 18, 2008, pp. 1894-1902. (Year: 2008).*

Bahade, S.S. et al.; "Laptop Theft Tracking a Review"; Jan. 2014; 3 pages.

* cited by examiner

HANDLING WIRELESS CLIENT DEVICES ASSOCIATED WITH A ROLE INDICATING A STOLEN DEVICE

BACKGROUND

The high resale value of wireless devices (e.g., smartphones), along with the personal information contained on such devices, make them a prime target for criminals and identity thieves. According to the consumer guides by Federal Communications Commission (FCC), to protect a wireless device, a user is advised to install and maintain anti-theft software application, which can locate the device from any computer or device connected to the internet; lock the device to restrict access; wipe sensitive data from the device; trigger the device to emit a loud noise to help the police locate it. In the event a wireless device is stolen, the user may attempt to locate the device by calling it or by using the anti-theft software application's geo-locator. The user shall immediately report the theft to the police, including the make and model, manufacture serial number, and IMEI or MEID or ESN number, and report to the cellular service provider. Cellular service provider may be able to use the IMEI or MEID or ESN number to disable the stolen wireless device and block access to the information it carries.

BRIEF DESCRIPTION OF THE DRAWINGS

The following detailed description references the drawings, wherein.

DETAILED DESCRIPTION

Law enforcement agencies and cellular service providers generally have procedures in place in the event a user of a wireless client device reports that the wireless client device is stolen. For example, the user may be required to report information about the stolen wireless client device, including the make and model, the manufacture serial number, the International Mobile Equipment Identity (IMEI), mobile equipment identifier (MEID), and/or electronic serial numbers (ESN) number, to the police department and/or the cellular service provider. The cellular service provider may be able to use the IMEI or MEID or ESN number to disable the stolen wireless client device and/or block access to the information it carries in the cellular network. The police department may maintain a national registry of stolen devices.

However, when the stolen device carries wireless local area network (WLAN) authentication credentials, existing mechanisms in the WLAN to handle such stolen devices are inadequate. For example, current solutions merely use the knowledge of stolen device identifiers for WLAN access controls. If a wireless client device is reported by a user to a network administrator as being stolen, the network administrator will associate the media access control (MAC) address uniquely corresponding to the stolen wireless client device with a flag indicating that the wireless client device is stolen. Thereafter, if any network device in the WLAN receives a connection request from the wireless client device previously flagged as stolen, the wireless client device's access to the WLAN will be denied. Nevertheless, a simple denial-of-service would not be sufficient to safeguard the wireless client device. The examples herein describe enhanced handling by the network devices in WLAN that can gather information that facilitates law enforcement agencies to investigate the thefts, leverage available external resources (e.g., national registries), and collaborate with external government and/or private organizations/agencies to provide comprehensive safeguard of wireless client devices.

As used herein, "network device" generally includes a device that is adapted to transmit and/or receive signaling and to process information within such signaling such as a station (e.g., any data processing equipment such as a compute cellular phone, personal digital assistant, tablet devices, etc.), an access point, data transfer devices (such as network switches, routers, controllers, etc.) or the like. For example, a "network device may refer to a network controller that comprises a hardware or a combination of hardware and software that enables connection between client devices and computer networks. In some implementations, a network device may refer to a server computing device (e.g., on-premise server, private, public, or hybrid cloud server) that comprises a hardware or a combination of hardware and software that can process and/or display network-related information. In some implementations, a network device may refer to an access point acting as a virtual master network controller among a cluster of access points.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

Figure 1:
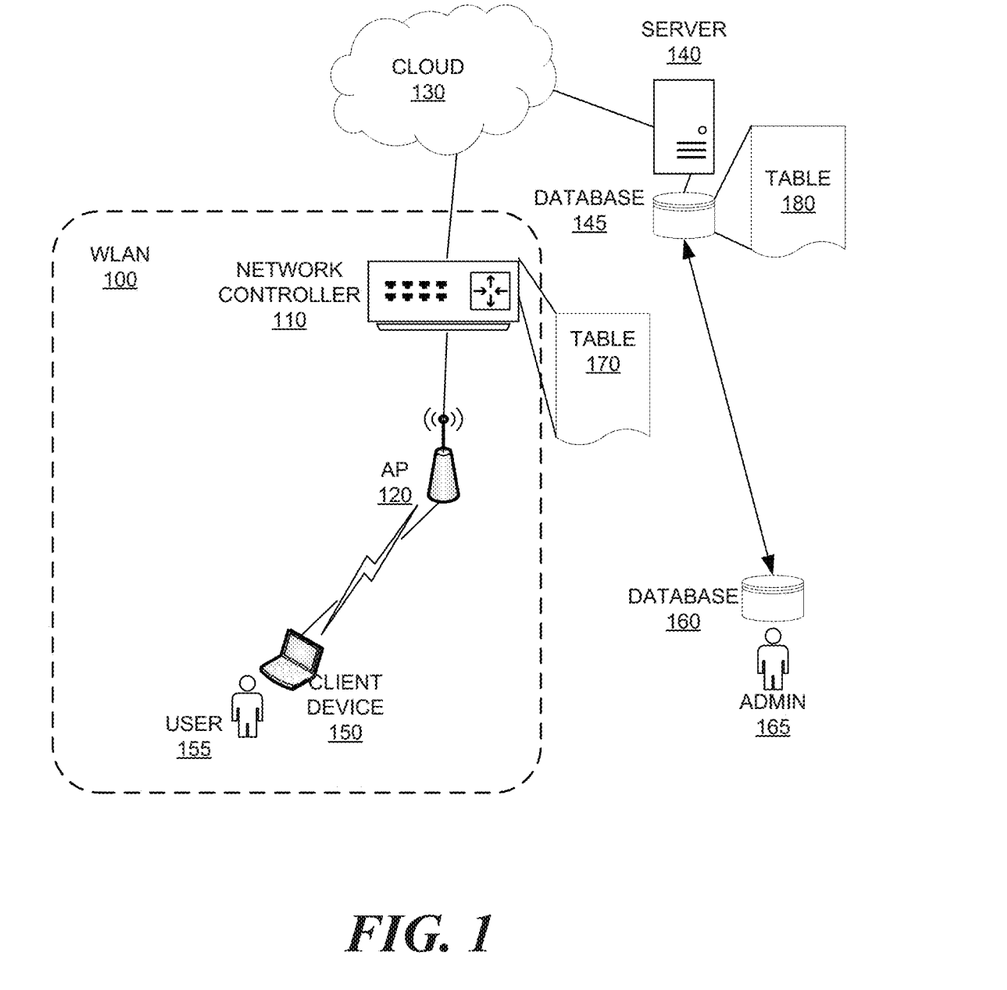
FIG. 1 is a block diagram of an example networking environment for handling wireless client devices associated with a role indicating a stolen device.

FIG. 1 is a block diagram of an example networking environment for handling wireless client devices associated with a role indicating a stolen device. FIG. 1 includes at least a wireless local area network (WLAN) 100, a cloud infrastructure 130, and a server 140. WLAN 100 and server 140 can be connected via cloud infrastructure 130.

WLAN 100 generally refers to a wireless computer network that links two or more devices using a wireless communication protocol (e.g., a protocol as specified in IEEE 802.11 standards) within a coverage area, thereby providing client devices with the ability to move around within the coverage area while remaining connected to the network. In this example, WLAN 100 may include at least a network controller 110, an access point (AP) 120 and a client device 150. AP 120 and network controller 110 may be connected via a wired connection. Client device 150 may be connected to AP 120 via a wireless or wired connection. Further, client device 150 is associated with user 155 and may store sensitive personal data of user 155.

Cloud 130 generally refers to a cloud infrastructure that enables ubiquitous access to shared pools of configurable system resources and higher-level services, which can be rapidly provisioned with reduced management effort over the Internet. Cloud 130 may be operated by a third-party vendor to enable organizations deployed with WLAN 100 to focus on their core businesses instead of information technology (IT) infrastructure and maintenance.

Server 140 may be any type of computing system that responds to requests across any network to provide a network and/or data service. Specifically, server 140 may provide network access control and/or authentication services for WLAN 100. Server 140 may access a database 145 to retrieve access control policies and rules associated with WLAN 100. In some examples, database 145 may be an intrinsic component of server 140. In other examples, database 145 may be external but accessible to server 140. Access control policies and rules may be stored in a number of tables, including table 180. In some examples, table 180 may include at a list of wireless client devices that are reported as being stolen to a network administrator (e.g., Admin 165). In Table 180, the wireless client devices may be uniquely identified by an identifier, including but not limited to, a MAC address, a manufacture serial number, IMEI number, MEID number, ESN number, etc.

In some examples, Admin 165 may represent an external entity, such as a law enforcement agency. Further, the law enforcement agency (e.g., Admin 165) may maintain a separate database (e.g., database 160) that includes identifiers of wireless client devices that are reported by a user (or owner of the device) as being stolen in a national or global registry. In this scenario, Table 180 may be synchronized periodically by server 140 with the separate database maintained by the external entity (e.g., database 160 maintained by the law enforcement agency).

In some examples, table 180 may include information about wireless client devices that are connected to or have been connected to WLAN 100 regardless of whether they have been reported as stolen. If a particular wireless client device (e.g., Client Device 150) is reported by a user (e.g., user 155) as being stolen, then server 140 can look up an entry corresponding to the particular wireless client device in table 180 and flag the particular wireless client device as being stolen. Similarly, server 140 can periodically receive updates from any database (e.g., database 160) from external entity that may store stolen device information, retrieve the device identifier from the received information, determine whether a record corresponding to the retrieved identifier exists in table 180, and if so, flag the record as associated with a wireless client device that is stolen. In some examples, table 180 may use a different wireless client device identifier (e.g., a MAC address) than the wireless client device identifier (e.g., IMEI, MEID, ESN, etc.) used by the external entity's database (e.g., database 160). Further, server 140 may convert the wireless client device identifier from a first type (e.g., IMEI, MEID, ESN, etc.) used by the external entity's database to a second type (e.g., MAC address) stored in table 180.

In normal circumstances, when client device 155 connects to WLAN 100, client device 155 transmits an association request to AP 120. Then, AP 120 transmits an association response back to client device 155. Next, client device 155 transmits an authentication request to AP 120, which is forwarded to network controller 110. Network controller 110 may be connected to an authentication server (e.g., server 140) either locally or remotely (possibly via cloud infrastructure 130). In some examples, network controller 110 may inquire server 140 to determine an appropriate user role for user 155 of client device 150 and/or corresponding WLAN resource access level for client device 150. For example, when the user role indicates that user 155 is an employee, client device 150 may have full access to resources in WLAN 100; whereas when the user role indicates that user 155 is a guest, client device 150 may have limited access to resources in WLAN 100. If the user role of user 155 indicates that access to WLAN 100 is granted, AP 120 may subsequently transmit an authentication response to client device 150. Thereafter, client device 150 can access resources in WLAN 100 subject to network policies associated with the user role.

According to examples of the present disclosure, after user 155 reports that client device 150 is stolen to a network administrator of WLAN 100, the network administrator may flag the record corresponding to client device 150 in table 180 as being stolen. As such, client device 150 is associated with a special user role indicating that client device 150 is stolen. Note that this special user role is device-specific. Thus, if user 155 owns multiple client devices, the other client devices may continue using the network credential of user 155 to log on to WLAN 100 with the user role (e.g., an employee) associated with user 155, and be provided with appropriate WLAN resource access based on the user role. However, if client device 150 attempts to connect to WLAN 100 using the network credential of user 155 after client device 150 is flagged as being stolen, network controller 110 may transmit the authentication request to server 140 as usual. But server 140 may determine that client device 150 has been assigned to the special user role indicating that client device 150 is stolen. Therefore, server 140 may notify network controller 110 of the special user role, for example, in an authentication response. Network controller 110 may maintain a local cache that stores a list of unique device identifiers that are associated with the special user role indicating stolen devices, for example, in table 170. Upon receiving such information from server 140, network controller 110 may update table 170 to include the unique device identifier (e.g., MAC address) associated with client device 150. Thus, if client device 150 later tries to connect to WLAN 100 through a different AP, network controller 110 can determine that client device 150 is associated with the special user role (i.e., a stolen client device) without forwarding the authentication request to server 140 via cloud infrastructure 130.

In some example, the special user role is associated with a set of special firewall policies created for the stolen devices. The set of special firewall policies govern how AP 120 may handle traffic to and from client device 150 after it is reported as being stolen. Therefore, instead of denying services to client device that is reported as being stolen, AP 120 may redirect client device 150 to a captive portal that requests a current user of client device 150 to complete a device registration process, in order to gather more information about the current user. The information gathered through the device registration process by the captive portal may be shared with external entities (e.g.; law enforcement agencies) for further investigations.

In some examples, the set of special firewall policies may allow client device 150 to be associated with AP 120, but with a basic set of WLAN access, e.g., The Hypertext Transfer Protocol (HTTP) access. The basic set of WLAN access can keep the current user of client device 150 engaged with WLAN 100 without compromising network security of WLAN 100 and user data privacy and integration of user 155.

In some examples, network controller 110 may notify an analytics and location engine (ALE) in WLAN 100 to start monitoring and tracking locations of client device 150. Specifically, because client device 150 is associated with the special user role indicating that it is stolen, the monitoring and tracking of client device location may be performed with higher frequency and/or accuracy for client device 150 than other client devices of WLAN 100. In one example, a larger than default number of APs in the radio frequency (RF) neighborhood of AP 120 are notified by the ALE to report signals received from client device 150 when client device 150 is authenticated to WLAN 100 with the special user role associated with stolen devices, Therefore, the ALE can collect more signal data associated with client device 150 than other client devices whose locations are tracked by the ALE. The location and analytical information gathered by the ALE may also be shared with external entities (e.g., law enforcement agencies) for further investigations.

In some examples, network controller 110 may initiate deep packet inspection (DPI) to start monitoring traffic transmitted to and from client device 150 upon its connection to WLAN 100. DPI allows network controller 110 to determine a type of application that client device 150 uses, a type of traffic (e.g., voice, video, etc.) that client device 150 transmits, etc. Traffic information gathered via DPI by network controller 110 may also be shared with external entities (e.g., law enforcement agencies) for further investigations.

In some examples, network controller 110 may initiate aggressive monitoring of network traffic to and from client device 150 that is associated with the special user role indicating a stolen device. Specifically, network controller 110 may notify a plurality of APs located in the RF neighborhood of AP 120 to increase scanning frequency on a particular wireless communication channel on which client device 150 is associated with AP 120. The plurality of APs can report signals from client device 150 that they detect during the more frequent channel scanning on the particular wireless communication channel, thereby enable network controller 110 to perform heightened surveillance on client device 150.

In some examples, network controller 110 may install a client-side application on client device 150 after client device 150 is authenticated to WLAN 100. The client-side application can be a lightweight background agency application that is capable of monitoring local parameters of client device 150, collecting usage statistics of client device 150, reporting locally collected device data to network devices in WLAN 100, etc. Because the client-side application is constantly being executed in a background of client device 150, the client-side application can periodically transmit packets to AP 120 in WLAN 100 at a particular interval to ensure that client device 150 will not enter into a power save mode. Therefore, the ALE in WLAN 100 can track the location of client device 150 continuously. Note that normal wireless client devices may be allowed to enter into a power save mode, and the ALE will refrain from sending packets to client devices in the power save mode. In some examples, network controller 110 may instruct AP 120 to set a bit in a traffic indication message (TIM) information element in a beacon and adjust a delivery traffic indication message (DTIM) interval value associated with client device 150 to prevent client device 150 from entering into the power save mode, Note that the DTIM interval value remains unchanged for other client devices associated with AP 120 and correspond to other user roles as determined by server 140.

In some examples, when client device 150 attempts to join WLAN 100, client device 150 may transmit a probe request that includes a service set identifier (SSID) that does not match any SSID associated with WLAN 100, or a probe request that does not include any SSID. Particularly, network connection information previously stored on client device 150 may be deleted after client device 150 is stolen. However, network controller 110 in WLAN 100 may allow connection to WLAN 100 using the SSID in the probe request received from client device 150. In some examples, the probe request received from client device 150 may not include any SSID at all. In other words, once client device 150 is identified as associated with the special role indicating that it is a stolen device, network controller 110 can impersonate any network with any SSID that client device 150 attempts to connect to. By allowing connection to WLAN despite of a mismatched SSID or a missing SSID in the probe request received from client device 150, network devices (e.g., network controller 110 and AP 120) can effectively keep client device 150 connected to and remain active in WLAN 100.

Figure 2:
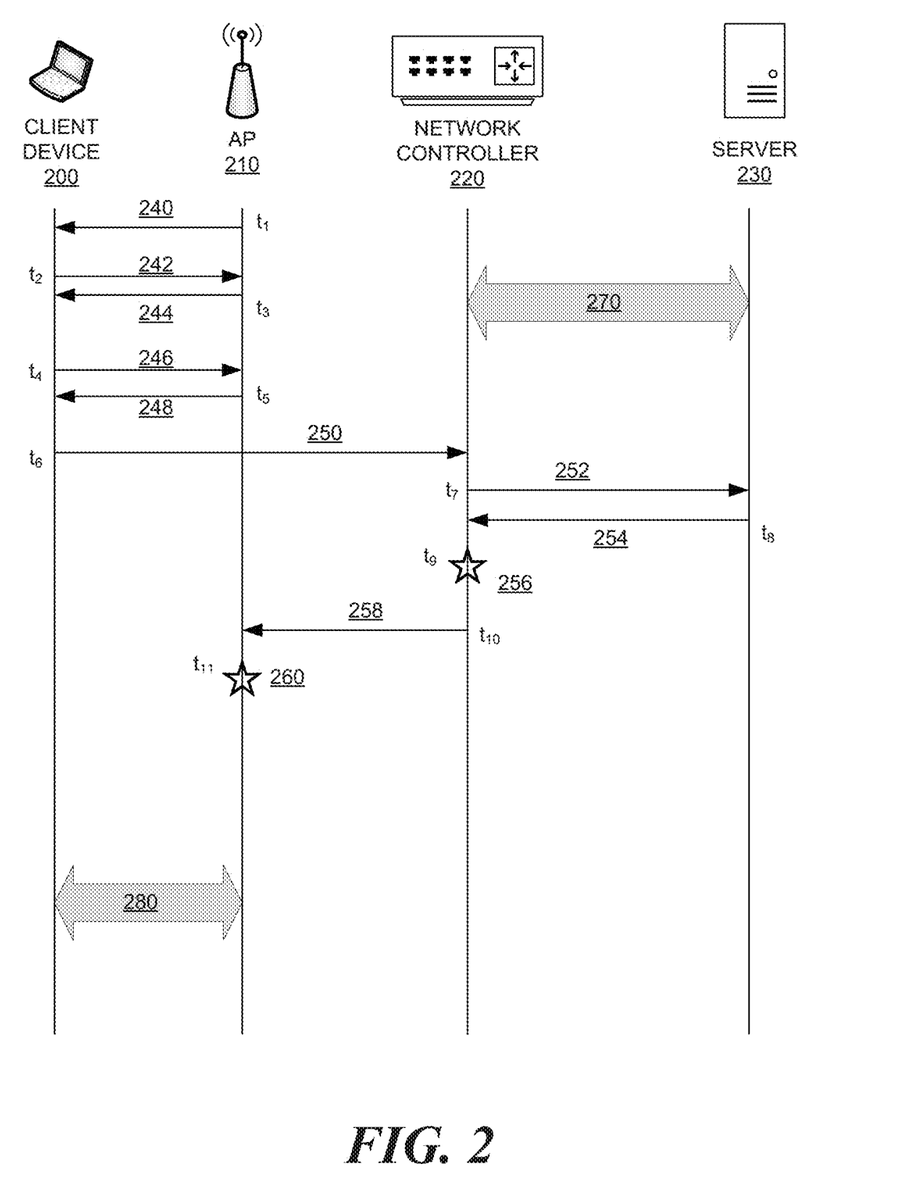
FIG. 2 is a sequence diagram of example communication exchanges for handling wireless client devices associated with a role indicating a stolen device.

FIG. 2 is a sequence diagram of example communication exchanges for handling wireless client devices associated with a role indicating a stolen device. For illustration purposes, FIG. 2 includes at least a client device 200, an AP 210, a network controller 220, and a server 230. AP 210 and network controller 220 are both network devices operating in a WLAN. AP 210 may provide network access to wireless client devices in the WLAN, whereas network controller 220 manages AP 210 and/or any client devices that serviced by AP 210. In this example, assuming that client device 200 has been reported as being stolen by its user. Accordingly, a unique device identifier (e.g., MAC address) corresponding to client device 200 has been flagged by a network administrator in a table accessible by server 230. Server 230 may perform authentication and/or authorization for a WLAN. AP 210 periodically broadcast beacon frames on its wireless operating channel. For example, at time point $t_1$, AP 210 may broadcast a beacon frame 240, which includes a service set identifier (SSID) corresponding to the WLAN. After beacon frame 240 is received by client device 200, at time point $t_2$, client device 200 may transmit a probe request 242 to AP 210 in order to connect to the WLAN. In some examples, probe request 242 may include a SSID. In some examples, the SSID may be a null value, because network configurations may be deleted after client device 200 is stolen. In some examples, the SSID in probe request 242 may be a value that is different from the SSID in beacon frame 240. In some examples, the SSID in probe request 242 may be the same as the SSID in beacon frame 240. Nevertheless, regardless whether the SSID in probe request 242 is null or matches the SSID in beacon frame 240, at time point $t_3$, AP 210 will transmit a probe response 244 to client device 200 in response to the receipt of probe request 242 from client device 200.

Thereafter, client device 200 may transmit an association request 246 to AP 210. In some examples, association request 246 may include a SSID corresponding to the WLAN. In some examples, the SSID may be a null value, because network configurations may be deleted after client device 200 is stolen. In some examples, the SSID in association request 246 may be a value that is different from the SSID advertised and broadcasted by AP 210 in beacon frame 240. In some examples, the SSID in association request 246 may be the same as the SSID in beacon frame 240. Nevertheless, regardless whether the SSID in association request 246 is null or matches the SSID in beacon frame 240, at time point $t_5$, AP 210 will transmit an association response 248 to client device 200 to establish a wireless association with client device 200.

Next, client device 200 may transmit an authentication request 250 at time point is to AP 210. AP 210 may forward authentication request 250 to network controller 220. In some examples, network controller 220 may maintain a local cache that is synchronized 270 periodically with a database that is maintained by authentication server 230. The local cache and the database store information about stolen devices in the WLAN that have been reported to the network administrator. Thus, network controller 220 may check its local cache to determine whether client device 200 is flagged as a stolen device. If so, network controller 220 may proceed to perform a set of special handling operations 256.

In some examples, as illustrated in FIG. 2, network controller 220 may transmit a request 252 to server 230 at time point $t_7$, whereas request 252 may include at least a unique device identifier (e.g., MAC address) corresponding to client device 200 and other authentication information, such as a user credential. Server 230 will determine a role associated with client device 200 and an access control level for client device 200 based on preconfigured network policies and rules that are applicable to the determined role. In some examples when server 230 determines that client device 200 is flagged as being stolen, server 230 can assign a special user role to client device 200, and transmit the information about the special user role to network controller 220 in an authentication response 254 at time point $t_8$.

At time point $t_9$, network controller 220 receives authentication response 254 indicating that client device 200 is associated with the special user role indicating that client device 200 is a stolen device. Therefore, network controller 220 may perform a set of special handling operations 256.

For example, according to the set of special handling operations 256, at time point $t_9$, network controller 220 may apply a set of special firewall policies created for stolen devices that are assigned with the special user role. The set of special firewall policies govern how AP 210 may handle traffic to and from client device 200. In some examples, rather than denying services to client device 200, at time point $t_{10}$, network controller 220 may transmit instructions 258 to AP 210 to redirect client device 200 to a captive portal to complete a device registration in order to gather more information about the current user. The information gathered through the device registration process by the captive portal may be shared with external entities (e.g., law enforcement agencies) for further investigations.

Furthermore, according to the set of special handling operations 256, at time point $t_{10}$, network controller 220 may transmit instructions 258 to AP 210 to allow client device 200 to be associated with AP 210, but with a basic set of WLAN access, e.g., The Hypertext Transfer Protocol (HTTP) access. The basic set of WLAN access can keep the current user of client device 200 engaged with the WLAN without compromising network security of WLAN and user data privacy and integration of the device owner.

Also, according to the set of special handling operations 256, at time point $t_9$, network controller 220 may notify an analytics and location engine (ALE) in the WLAN to start monitoring and tracking locations of client device 200. Specifically, because client device 200 is associated with the special user role indicating that it is stolen, the monitoring and tracking of client device location may be performed with higher frequency and/or accuracy for client device 200 than other client devices in the WLAN. In one example, a larger than default number of APs in the radio frequency (RF) neighborhood of AP 210 are notified by the ALE to report signals received from client device 200, such that the ALE can collect more signal data associated with client device 200 than other client devices in the WLAN. The location and analytical information gathered by the ALE may also be shared with external entities (e.g., law enforcement agencies) for further investigations.

Furthermore, according to the set of special handling operations 256, a time point $t_{10}$, network controller 220 may transmit instructions 258 to AP 210, instructing AP 210 to perform deep packet inspection (DPI) to monitor data traffic transmitted to and from client device 200. Traffic information gathered via DPI by network controller 220 may also be shared with external entities (e.g., law enforcement agencies) for further investigations.

In some examples, according to the set of special handling operations 256, at time point $t_9$, network controller 220 may initiate aggressive monitoring of network traffic to and from client device 200 that is associated with the special user role. Specifically, network controller 220 may notify a plurality of APs located in the RF neighborhood of AP 210 to increase the scanning frequency or the dwelling time on a particular wireless communication channel on which client device 200 is associated with AP 210. The plurality of APs can report signals from client device 200 that they detect on the particular wireless communication channel during the aggressive monitoring. Analytics information based signal data gathered via aggressive monitoring by network controller 220 may be shared with external entities (e.g., law enforcement agencies) for further investigations.

In some examples, according to the set of special handling operations 256, at time point $t_{10}$, network controller 220 may transmit instructions 258 to AP 210 to install a client-side application on client device 200. The client-side application is capable of monitoring local parameters of client device 200, collecting usage statistics of client device 200, reporting locally collected device data to network devices in the WLAN, etc. Because the client-side application is constantly being executed in a background thread of client device 200, the client-side application can transmit packets to AP 210 at a particular interval to ensure that client device 200 does not enter into a power save mode.

In some examples, according to the set of special handling operations 256, at time point $t_{10}$, network controller 220 may transmit instructions 258 to AP 210 to set a bit in a traffic indication message (TIM) information element in a beacon and adjust a DTIM interval value associated with client device 200 to prevent client device 200 from entering into the power save mode. Note that the DTIM interval value remains unchanged for other client devices associated with AP 210 and correspond to other user roles as determined by server 230.

At time point $t_{11}$, AP 210 executes instructions 258 received from network controller 220 to perform heightened surveillance that allow stolen client device 200 to maintain an active connection 280 to AP 210, while collecting information about stolen client device 200, which can be reported to external entities (e.g., law enforcement agencies).

Figure 3:
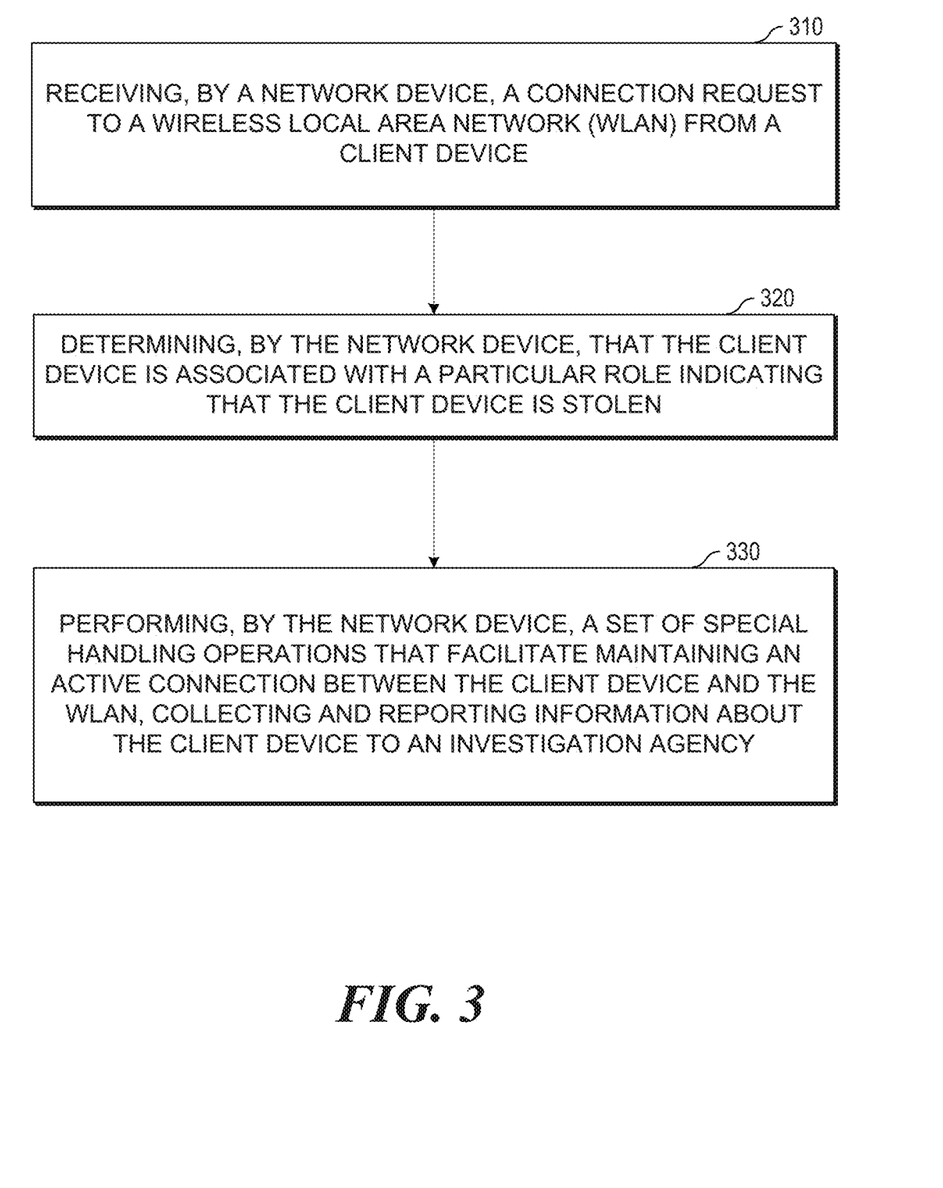
FIG. 3 is a flowchart of an example process of handling wireless client devices associated with a role indicating a stolen device.

Processes of Handling Wireless Client Devices Associated with a Role Indicating a Stolen Device FIG. 3 is a flowchart of an example process of handling wireless client devices associated with a role indicating a stolen device. During operations, a network device may receive a connection request to a wireless local area network (WLAN) from a client device (operation 310). Then, the network device may determine that the client device is associated with a particular role indicating that the client device is stolen (operation 320). Furthermore, the network device may perform a set of special handling operations that facilitates maintaining an active connection between the client device and the WLAN, collecting and reporting information about the client device to an investigation agency.

In some examples, the network device may include a network controller that has a cache storage storing a plurality of client device identifiers corresponding to reported stolen devices. The plurality of client device identifiers may include a particular identifier uniquely identifying the client device. For example, the particular identifier may include at least one of: a media access control (MAC) address, a manufacture serial number, an International Mobile Equipment Identity (IMEI), a mobile equipment identifier (MEID), and an electronic serial numbers (ESN).

In some examples, the set of special handling operations may include instructing an access point in the WLAN to redirect the client device associated with the particular role indicating that the client device is stolen to a captive portal to complete a device registration. The information about the client device gathered by the captive portal may be shared with the investigation agency.

In some examples, the set of special handling operations may include instructing an access point in the WLAN to allow connection from the client device while granting the client device limited access to network resources in the WLAN. The limited access is granted to the client device to maintain the active connection between the client device and the WLAN.

In some examples, the set of special handling operations may include notifying a location engine in the WLAN to start tracking locations of the client device at a higher frequency than a frequency previously used before the client device is associated with the particular role indicating that the client device is stolen.

In some examples, the set of special handling operations may include notifying a location engine in the WLAN to start collecting signal information related to the client device from a higher number of access points (APs) than a number of APs previously used before the client device is associated with the particular role indicating that the client device is stolen.

In some examples, the set of special handling operations may include notify an access point that the client device is associated with to perform deep packet inspection (DPI) to monitor data traffic transmitted to and from the client device. The traffic information gathered via the DPI is shared with the investigation agency.

In some examples, the set of special handling operations may include instructing a plurality of access points within a radio frequency (RF) neighborhood of an access point, with which the client device is associated on a particular wireless communication channel, to increase a scanning time or a scanning frequency on the particular wireless communication channel.

In some examples, the set of special handling operations may include instructing an access point that the client device is associated with to install an application on the client device. The application may be executed in a background process of the client device to collect and report information about the client device to the investigation agency. Further, the application may transmit a packet to the access point from the client device at a predetermined interval to prevent the client device from entering into a power save mode.

In some examples, the set of special handling operations may include instructing an access point that the client device is associated with to set a bit in a traffic indication message (TIM) information element in a beacon and adjust a delivery traffic indication message (DTIM) interval value corresponding to the client device to prevent client device from entering into a power save mode.

In some examples, the network device may further transmit a connection response allowing the client device to be connected with the WLAN, whereas the connection request received from the client device comprises a first service set identifier (SSID) value that is different from a second SSID value broadcasted in a beacon frame by an access point in the WLAN. In some examples; the first SSID may include a null value.

Figure 4:
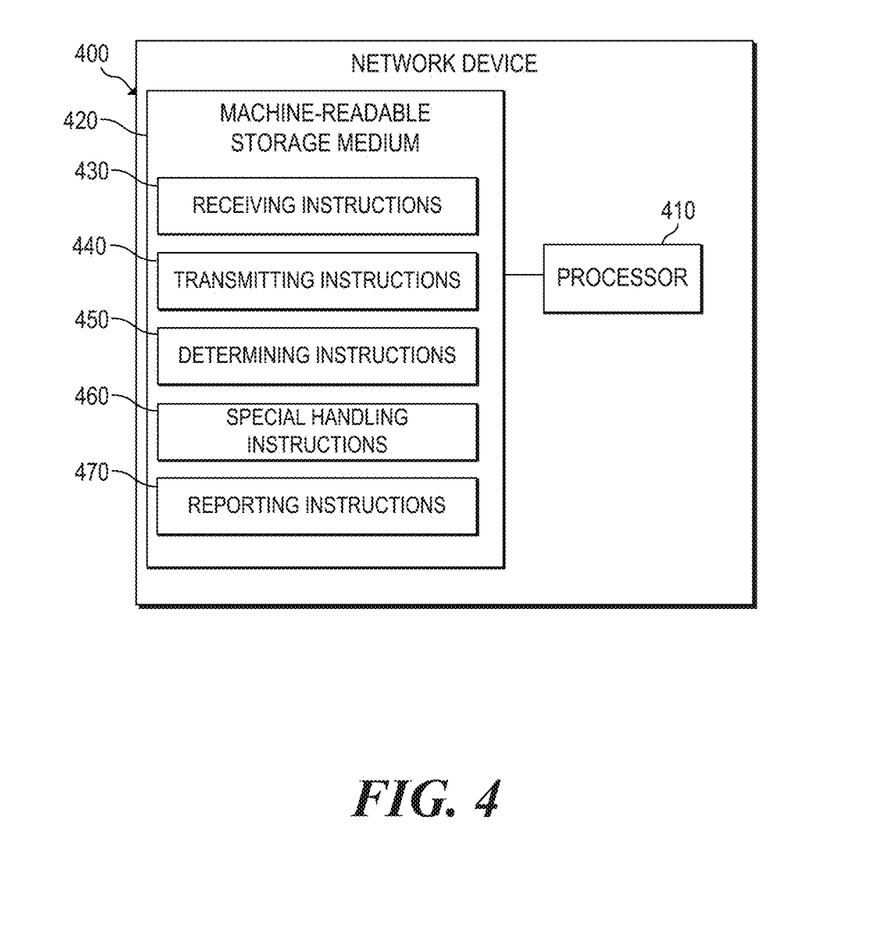
FIG. 4 is a block diagram of an example network device to handle wireless client devices associated with a role indicating a stolen device.

Network Device to Handle Wireless Client Devices Associated with a Role Indicating a Stolen Device FIG. 4 is a block diagram of an example network device to handle wireless client devices associated with a role indicating a stolen device. As used herein, a network device may be implemented, at least in part; by a combination of hardware and programming. For example, the hardware may comprise at least one processor (e.g., processor 410) and the programming may comprise instructions, executable by the processor(s), stored on at least one machine-readable storage medium (e.g., 420). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 410 may fetch, decode, and execute instructions stored on storage medium 420 to perform the functionalities described below in relation to receiving instructions 430, transmitting instructions 440, determining instructions 450, special handling instructions 460, and reporting instructions 470. In other examples, the functionalities of any of the instructions of storage medium 420 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 4, storage medium 420 may be implemented by one machine-readable storage medium, or multiple machine-readable storage media.

Although network device 400 includes at least one processor 410 and machine-readable storage medium 420, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture), An article or article of manufacture may refer to any manufactured single component or multiple components.

Specifically, instructions 430-470 may be executed by processor 410 to: receiving a connection request to a wireless local area network (WLAN) from a client device; determining that the client device is associated with a particular role indicating that the client device is stolen; performing a set of special handling operations that facilitates maintaining an active connection between the client device and the WLAN, collecting and reporting information about the client device to an investigation agency; instructing an access point in the WLAN to redirect the client device associated with the particular role indicating that the client device is stolen to a captive portal to complete a device registration, wherein information about the client device gathered by the captive portal is shared with the investigation agency; instructing an access point in the WLAN to allow connection from the client device while granting the client device limited access to network resources in the WLAN, the limited access being granted to the client device to maintain the active connection between the client device and the WLAN; notifying a location engine in the WLAN to start tracking locations of the client device at a higher frequency than a frequency previously used before the client device is associated with the particular role indicating that the client device is stolen; notifying a location engine in the WLAN to start collecting signal information related to the client device from a higher number of access points (APs) than a number of APs previously used before the client device is associated with the particular role indicating that the client device is stolen; etc.

Moreover, instructions 430-470 may be executed by processor 410 to: notifying an access point that the client device is associated with to perform deep packet inspection (DPI) to monitor data traffic transmitted to and from the client device, wherein traffic information gathered via the DPI is shared with the investigation agency; instructing a plurality of access points within a radio frequency (RF) neighborhood of an access point, with which the client device is associated on a particular wireless communication channel, to increase a scanning time or a scanning frequency on the particular wireless communication channel; instructing an access point that the client device is associated with to install an application on the client device, the application being executed in a background process of the client device to collect and report information about the client device to the investigation agency; instructing an access point that the client device is associated with to set a bit in a traffic indication message (TIM) information element in a beacon and adjust a delivery traffic indication message (DTIM) interval value corresponding to the client device to prevent client device from entering into a power save mode; transmitting a connection response allowing the client device to be connected with the WLAN, wherein the connection request received from the client device comprises a first service set identifier (SSID) value that is different from a second SSID value broadcasted in a beacon frame by an access point in the WLAN; etc.

We claim:

1. A method comprising:
   receiving, by a network device, a connection request to a wireless local area network (WLAN) from a client device;
   determining, by the network device, that the client device is associated with a particular role indicating that the client device is stolen;
   transmitting a connection response allowing the client device to be connected with the WLAN, wherein the connection request received from the client device comprises a first service set identifier (SSID) value that is different from a second SSID value broadcasted in a beacon frame by an access point in the WLAN; and
   performing, by the network device, a set of special handling operations that facilitates maintaining an active connection between the client device and the WLAN, collecting and reporting information about the client device to an investigation agency.

2. The method of claim 1, wherein the network device comprises a network controller that includes a cache storage that stores a plurality of client device identifiers corresponding to reported stolen devices, the plurality of client device identifiers including a particular identifier uniquely identifying the client device.

3. The method of claim 2, wherein the particular identifier comprises at least one of: a media access control (MAC) address, a manufacture serial number, an International Mobile Equipment Identity (IMEI), a mobile equipment identifier (MEID), and an electronic serial numbers (ESN).

4. The method of claim 1, wherein the set of special handling operations comprises:
   instructing an access point in the WLAN to redirect the client device associated with the particular role indicating that the client device is stolen to a captive portal to complete a device registration, wherein information about the client device gathered by the captive portal is shared with the investigation agency.

5. The method of claim 1, wherein the set of special handling operations comprises:
   instructing an access point in the WLAN to allow connection from the client device while granting the client device limited access to network resources in the WLAN, the limited access being granted to the client device to maintain the active connection between the client device and the WLAN.

6. The method of claim 1, wherein the set of special handling operations comprises:
   notifying a location engine in the WLAN to start tracking locations of the client device at a higher frequency than a frequency previously used before the client device is associated with the particular role indicating that the client device is stolen.

7. The method of claim 1, wherein the set of special handling operations comprises:
   notifying a location engine in the WLAN to start collecting signal information related to the client device from a higher number of access points (APs) than a number of APs previously used before the client device is associated with the particular role indicating that the client device is stolen.

8. The method of claim 1, wherein the set of special handling operations comprises:
   notify an access point that the client device is associated with to perform deep packet inspection (DPI) to monitor data traffic transmitted to and from the client device, wherein traffic information gathered via the DPI is shared with the investigation agency.

9. The method of claim 1, wherein the set of special handling operations comprises:
   instructing a plurality of access points within a radio frequency (RF) neighborhood of an access point, with which the client device is associated on a particular wireless communication channel, to increase a scanning time or a scanning frequency on the particular wireless communication channel.

10. The method of claim 1, wherein the set of special handling operations comprises:

instructing an access point that the client device is associated with to install an application on the client device, the application being executed in a background process of the client device to collect and report information about the client device to the investigation agency.

11. The method of claim 10, wherein the application transmits a packet to the access point from the client device at a predetermined interval to prevent the client device from entering into a power save mode.

12. The method of claim 1, wherein the set of special handling operations comprises:
instructing an access point that the client device is associated with to set a bit in a traffic indication message (TIM) information element in a beacon and adjust a delivery traffic indication message (DTIM) interval value corresponding to the client device to prevent client device from entering into a power save mode.

13. The method of claim 1, wherein the first SSID comprises a null value.

14. A network device, comprising at least:
a memory;
a processor executing instructions from the memory to:
receive a connection request to a wireless local area network (WLAN) from a client device;
determine that the client device is associated with a particular role indicating that the client device is stolen;
transmit a connection response allowing the client device to be connected with the WLAN, wherein the connection request received from the client device comprises a first service set identifier (SSID) value that is different from a second SSID value broadcasted in a beacon frame by an access point in the WLAN; and
perform a set of special handling operations that facilitates maintaining an active connection between the client device and the WLAN, collecting and reporting information about the client device to an investigation agency.

15. The network device of claim 14, wherein the set of special handling operations comprises at least one of:
instructing an access point in the WLAN to redirect the client device associated with the particular role indicating that the client device is stolen to a captive portal to complete a device registration, wherein information about the client device gathered by the captive portal is shared with the investigation agency;
instructing an access point in the WLAN to allow connection from the client device while granting the client device limited access to network resources in the WLAN, the limited access being granted to the client device to maintain the active connection between the client device and the WLAN;
notifying a location engine in the WLAN to start tracking locations of the client device at a higher frequency than a frequency previously used before the client device is associated with the particular role indicating that the client device is stolen;
notifying a location engine in the WLAN to start collecting signal information related to the client device from a higher number of access points (APs) than a number of APs previously used before the client device is associated with the particular role indicating that the client device is stolen;
notifying an access point that the client device is associated with to perform deep packet inspection (DPI) to monitor data traffic transmitted to and from the client device, wherein traffic information gathered via the DPI is shared with the investigation agency;

instructing a plurality of access points within a radio frequency (RF) neighborhood of an access point, with which the client device is associated on a particular wireless communication channel, to increase a scanning time or a scanning frequency on the particular wireless communication channel;
instructing an access point that the client device is associated with to install an application on the client device, the application being executed in a background process of the client device to collect and report information about the client device to the investigation agency; and
instructing an access point that the client device is associated with to set a bit in a traffic indication message (TIM) information element in a beacon and adjust a delivery traffic indication message (DTIM) interval value corresponding to the client device to prevent client device from entering into a power save mode.

16. A non-transitory machine-readable storage medium encoded with instructions executable by at least one processor of a network device, the machine-readable storage medium comprising instructions to:
receive a connection request to a wireless local area network (WLAN) from a client device;
determine that the client device is associated with a particular role indicating that the client device is stolen;
transmit a connection response allowing the client device to be connected with the WLAN, wherein the connection request received from the client device comprises a first service set identifier (SSID) value that is different from a second SSID value broadcasted in a beacon frame by an access point in the WLAN; and
perform a set of special handling operations that facilitates maintaining an active connection between the client device and the WLAN, collecting and reporting information about the client device to an investigation agency.

17. The non-transitory machine-readable storage medium of claim 16, wherein the set of special handling operations comprises at least one of:
instructing an access point in the WLAN to redirect the client device associated with the particular role indicating that the client device is stolen to a captive portal to complete a device registration, wherein information about the client device gathered by the captive portal is shared with the investigation agency;
instructing an access point in the WLAN to allow connection from the client device while granting the client device limited access to network resources in the WLAN, the limited access being granted to the client device to maintain the active connection between the client device and the WLAN;
notifying a location engine in the WLAN to start tracking locations of the client device at a higher frequency than a frequency previously used before the client device is associated with the particular role indicating that the client device is stolen;
notifying a location engine in the WLAN to start collecting signal information related to the client device from a higher number of access points (APs) than a number of APs previously used before the client device is associated with the particular role indicating that the client device is stolen;
notifying an access point that the client device is associated with to perform deep packet inspection (DPI) to monitor data traffic transmitted to and from the client device, wherein traffic information gathered via the DPI is shared with the investigation agency;

instructing a plurality of access points within a radio frequency (RF) neighborhood of an access point, with which the client device is associated on a particular wireless communication channel, to increase a scanning time or a scanning frequency on the particular wireless communication channel;

instructing an access point that the client device is associated with to install an application on the client device, the application being executed in a background process of the client device to collect and report information about the client device to the investigation agency; and instructing an access point that the client device is associated with to set a bit in a traffic indication message (TIM) information element in a beacon and adjust a delivery traffic indication message (DTIM) interval value corresponding to the client device to prevent client device from entering into a power save mode.

* * * * *